(12) United States Patent
McKenzie

(10) Patent No.: US 10,667,527 B1
(45) Date of Patent: Jun. 2, 2020

(54) MOTORIZED BREAD SCOOPER

(71) Applicant: Linsdale McKenzie, West Hempstead, NY (US)

(72) Inventor: Linsdale McKenzie, West Hempstead, NY (US)

(*) Notice: Subject to any disclaimer, the term of this patent is extended or adjusted under 35 U.S.C. 154(b) by 372 days.

(21) Appl. No.: 15/818,891

(22) Filed: Nov. 21, 2017

(51) Int. Cl.
*A47J 43/28* (2006.01)
*A21C 15/00* (2006.01)

(52) U.S. Cl.
CPC ............ *A21C 15/00* (2013.01); *A47J 43/288* (2013.01)

(58) Field of Classification Search
CPC ............................ A21C 15/00; Y10T 83/4766
See application file for complete search history.

(56) References Cited

U.S. PATENT DOCUMENTS

| 3,937,850 | A | 2/1976 | Farha |
| 4,979,419 | A | 12/1990 | Sonkin |
| 5,033,193 | A | 7/1991 | Valenti |
| 5,557,998 | A | 9/1996 | Schwartz |
| 5,799,401 | A | 9/1998 | Gering |
| 6,186,058 | B1 | 2/2001 | Ehrig, Jr. et al. |
| 7,020,968 | B1 | 4/2006 | Bassam |
| D767,897 | S | 10/2016 | Hosler |
| 10,098,357 | B1 * | 10/2018 | Nasar ..................... B26B 27/00 |

* cited by examiner

*Primary Examiner* — Jason L Vaughan
*Assistant Examiner* — Amanda Kreiling
(74) *Attorney, Agent, or Firm* — Kyle A. Fletcher, Esq.

(57) ABSTRACT

The motorized bread scooper is a hand-held device comprising a housing, a handle, a motor and a bead loop. The device may be held, using the handle, with the bead loop against a baked product such as a bagel or roll and the motor may be energized. The motor drives a sprocket within the housing and the sprocket pulls the bead loop through the housing. As beads enter one aperture of the housing, other beads exit the housing at another aperture. As the beads move past the bottom surface of the housing, they may contact the baked product and pull small pieces of excessive dough off of the baked product.

18 Claims, 3 Drawing Sheets

US 10,667,527 B1

MOTORIZED BREAD SCOOPER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of kitchen tools, more specifically, a motorized bread scooper.

SUMMARY OF INVENTION

The motorized bread scooper is a hand-held device comprising a housing, a handle, a motor and a bead loop. The device may be held, using the handle, with the bead loop against a baked product such as a bagel or roll and the motor may be energized. The motor drives a sprocket within the housing and the sprocket pulls the bead loop through the housing. As beads enter one aperture of the housing, other beads exit the housing at another aperture. As the beads move past the bottom surface of the housing, they may contact the baked product and pull small pieces of excessive dough off of the baked product.

An object of the invention is to provide a hand-held, battery-powered, motorized bread scooper.

Another object of the invention is to provide a bead loop that passed through the housing, exits the housing through a first bead aperture on the bottom surface of the housing, and re-enter the housing through a second bead aperture elsewhere on the bottom surface of the housing.

A further object of the invention is to pull excessive dough from baked product using the movement of the bead loop across the baked product.

These together with additional objects, features and advantages of the motorized bread scooper will be readily apparent to those of ordinary skill in the art upon reading the following detailed description of the presently preferred, but nonetheless illustrative, embodiments when taken in conjunction with the accompanying drawings.

In this respect, before explaining the current embodiments of the motorized bread scooper in detail, it is to be understood that the motorized bread scooper is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorized bread scooper.

It is therefore important that the claims be regarded as including such equivalent construction insofar as they do not depart from the spirit and scope of the motorized bread scooper. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
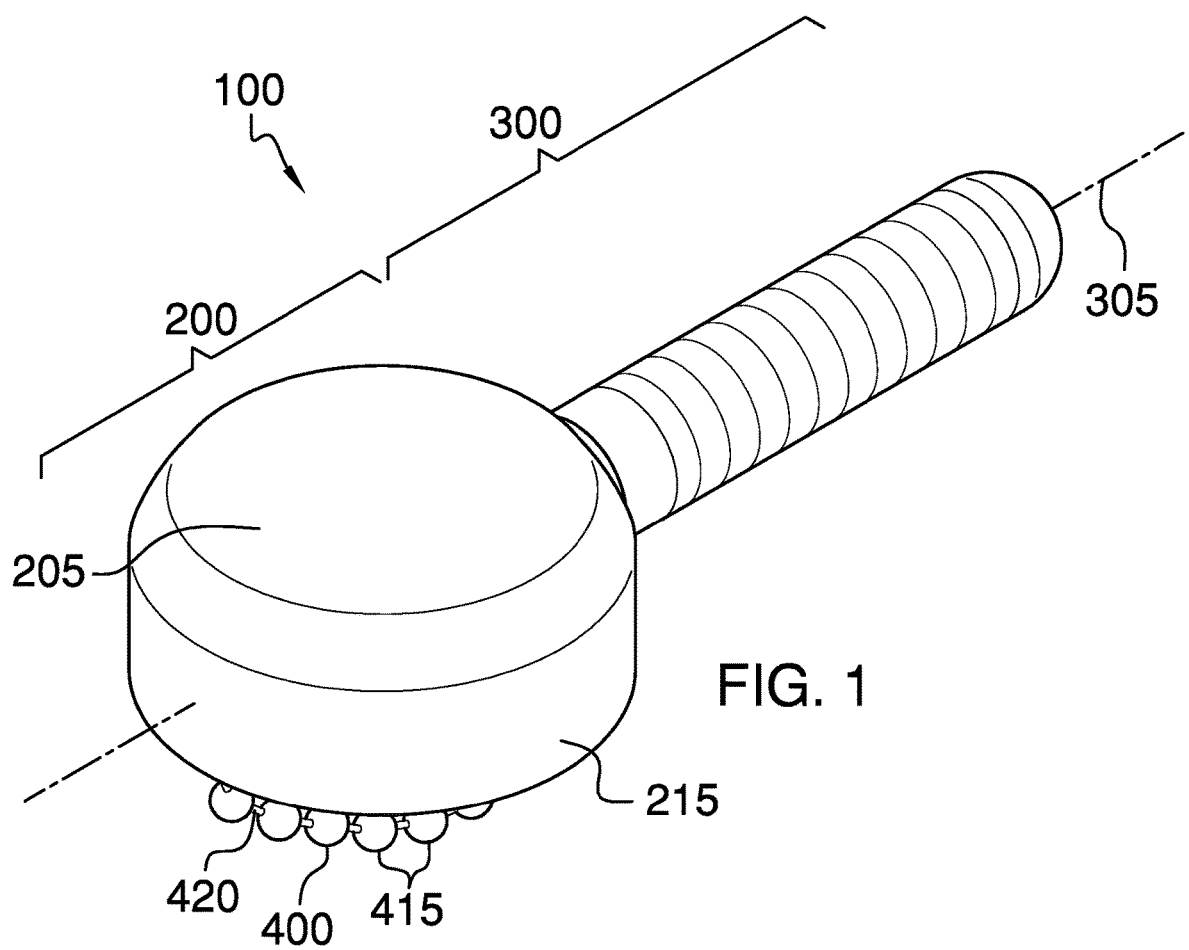
FIG. 1 is a perspective view of an embodiment of the disclosure.
Figure 2:
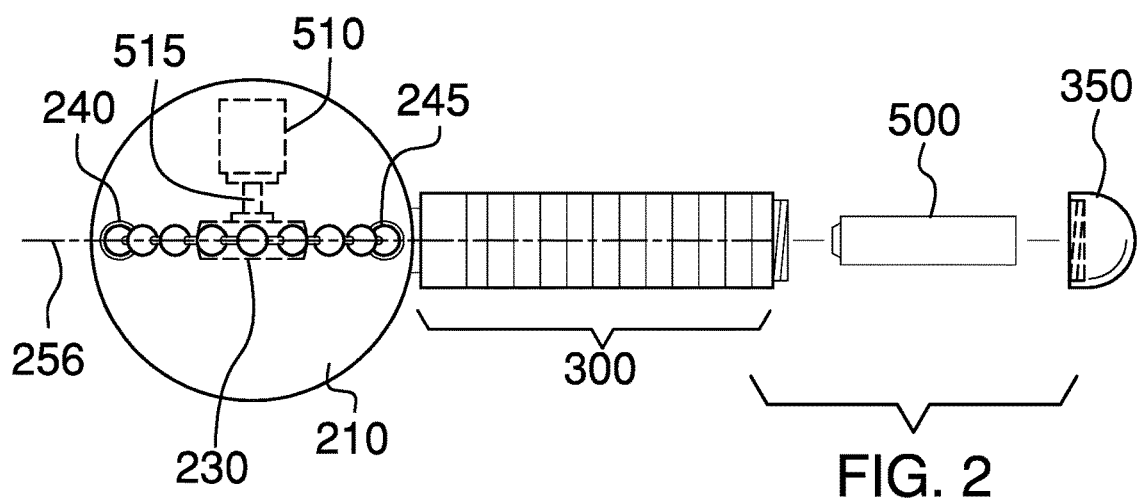
FIG. 2 is a bottom view of an embodiment of the disclosure.
Figure 3:
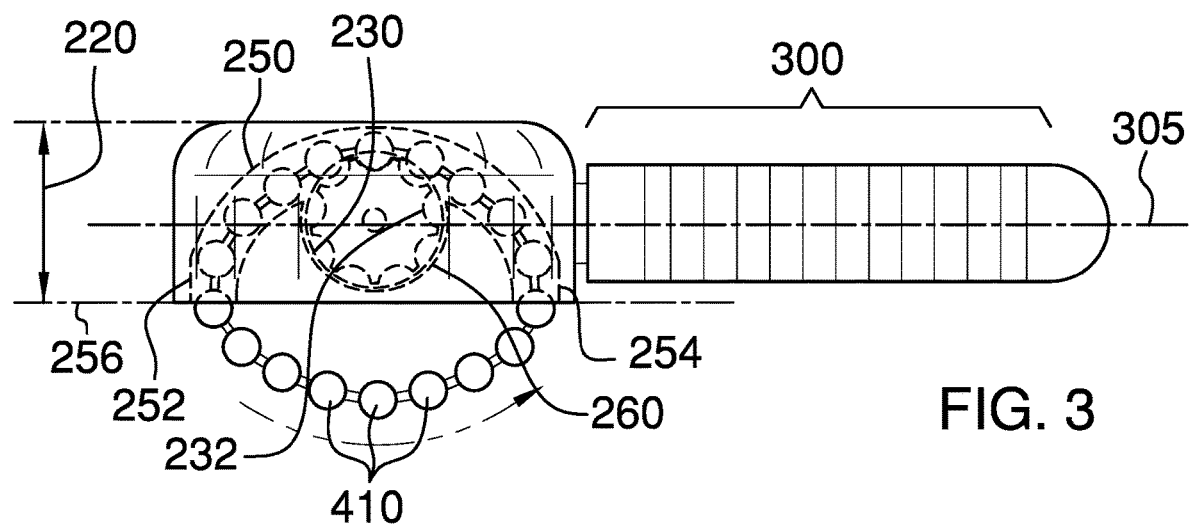
FIG. 3 is a side view of an embodiment of the disclosure.
Figure 4:
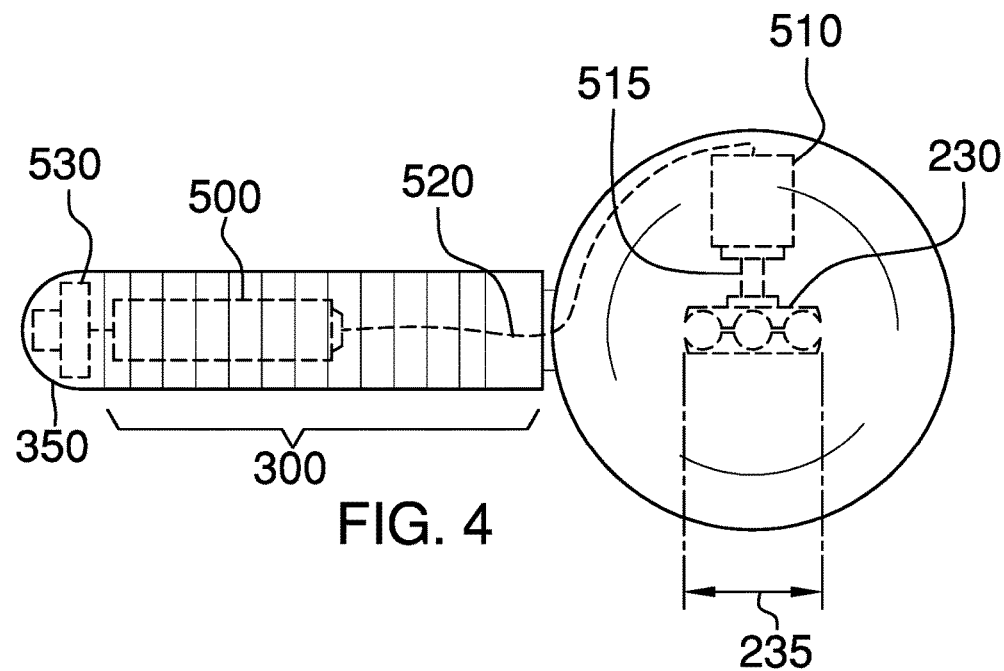
FIG. 4 is a top view of an embodiment of the disclosure.
Figure 5:
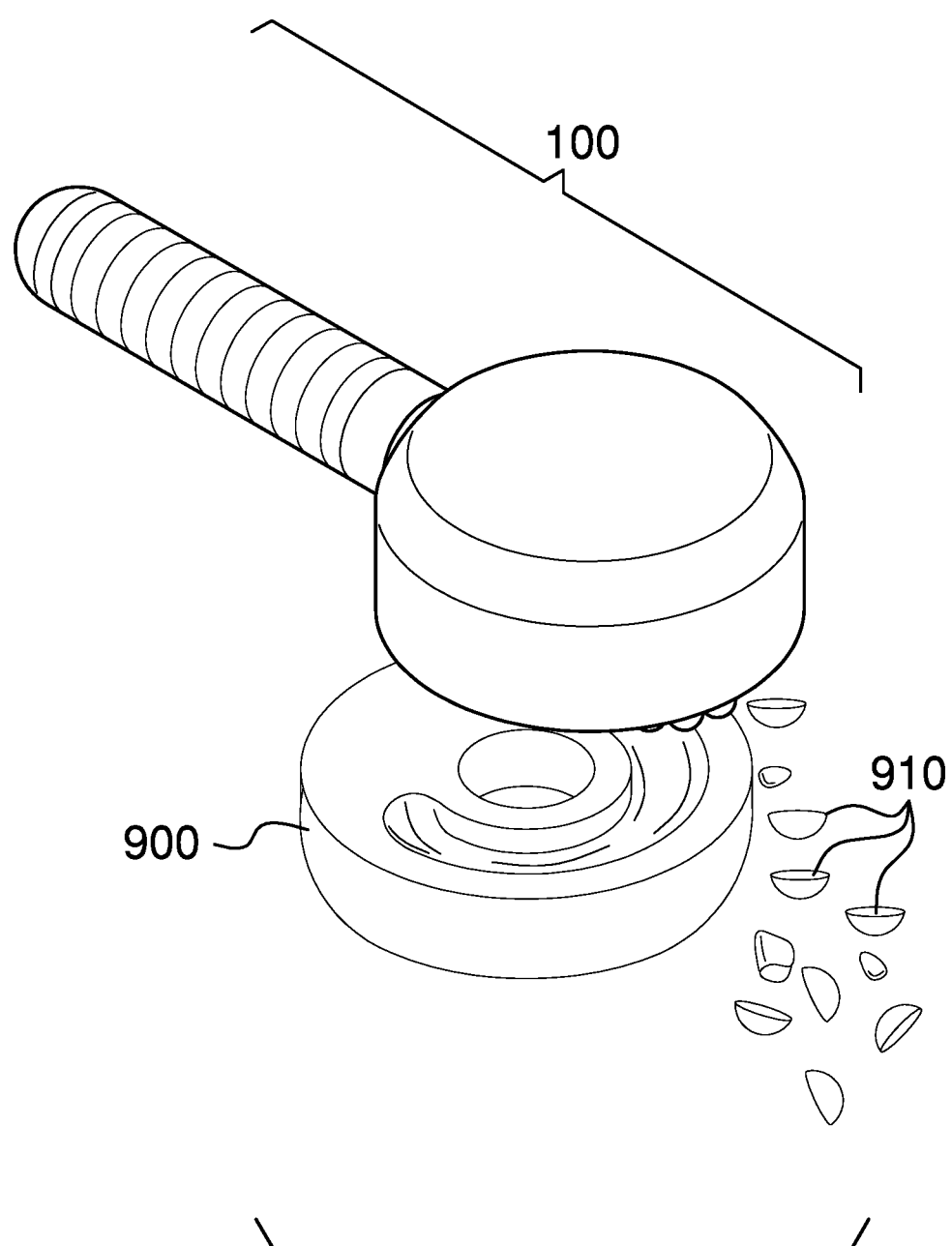
FIG. 5 is an in-use view of an embodiment of the disclosure.

Detailed reference will now be made to a first potential embodiment of the disclosure, which is illustrated in FIGS. 1 through 5.

The motorized bread scooper 100 (hereinafter invention) comprises a housing 200, a handle 300, a motor 510, and a bead loop 400. The invention 100 is a handheld device that removes excessive dough 910 from a baked product 900 by pulling the bead loop 400 through the baked product 900. Removal of the excessive dough 910 may reduce caloric intake resulting from eating the baked product 900.

The housing 200 comprises a top surface 205, a bottom surface 210, and one or more sides 215. The housing 200 may be an enclosure for the motor 510, a sprocket 230, and a bead guide 250. The bottom surface 210 of the housing 200 may comprise a first bead aperture 240 and a second bead aperture 245. The first bead aperture 240 and the second bead aperture 245 may be aligned such that a line 256 passing through the center of the first bead aperture 240 and the center of the second bead aperture 245 is parallel to a longitudinal axis of the handle 305.

The motor 510 may be mounted within the housing 200 such that a shaft 515 of the motor 510 is oriented perpendicularly to the longitudinal axis of the handle 305 and parallel to the bottom surface 210 of the housing 200. The shaft 515 may be positioned between the top surface 205 and the bottom surface 210, generally at the halfway point between the top surface 205 and the bottom surface 210.

The sprocket 230 may be coupled to the shaft 515 of the motor 510. A diameter of the sprocket 235 may be less than a height of the motor housing 220. The sprocket 230 may comprise a plurality of dimples 232 surrounding its circumference. The spacing of the plurality of dimples 232 may match the distance between adjacent beads 415 of the bead loop 400. As the sprocket 230 moves, a plurality of beads 410 may momentarily rest in the plurality of dimples 232 and may become trapped between the plurality of dimples 232 and the bead guide 250. This trapping of the plurality of beads 410 within the plurality of dimples 232 may allow the sprocket 230 to move the bead loop 400 as the sprocket 230 spins.

The bead guide 250 may be an arch-shaped, tubular pathway for the bead loop 400, which directs the path of the bead loop 400 as it passes through the housing 200. The bead guide 250 may be coupled to the interior of the housing 200. The bead guide 250 may be oriented such that a first end of the bead guide 252 is aligned with the first bead aperture 240 and a second end of the bead guide 254 is aligned with the second bead aperture 245. The bead guide 250 may be positioned to align with the sprocket 230 such that the bead loop 400 must pass over the sprocket 230 as it moves through the housing 200. The bead guide 250 may comprise a sprocket extension 260 to enclose the sprocket 230 and to allow the bead loop 400 to pass from the bead guide 250 onto the sprocket 230 and back into the bead guide 250 as the bead loop 400 moves through the housing 200.

The bead loop 400 may comprise the plurality of beads 410 with each of the adjacent beads 415 coupled by a bead-to-bead coupling 420. The bead loop 400 may form a continuous loop with no identifiable end. The length of the continuous loop may be at least as long as the distance through the bead guide 250 from the first bead aperture 240 to the second bead aperture 245 plus the distance between the first bead aperture 240 and the second bead aperture 245 along the bottom surface 210 of the housing 200.

The plurality of beads 410 may be spherical plastic beads. The bead-to-bead coupling 420 may be a wire, cord, or other sinuous material running through the center of the plurality of beads 410. As the motor 510 moves the sprocket 230, the bead loop 400 may be routed through the housing 200 in a path where the bead loop 400 moves over the top of the sprocket 230, away from the handle 300, into the bead guide 250 and emerges from the housing 200 at the first bead aperture 240. The bead loop 400 then moves towards the handle 300 and enters the housing 200 again at the second bead aperture 245. From there, the bead loop 400 moves through the bead guide 250 away from the handle 300 and towards the sprocket 230, where the path repeats. While the bead loop 400 is outside of the housing 200 and moving towards the handle 300, it may pull the excessive dough 910 from the baked product 900.

The handle 300 may be a cylindrically shaped hand hold for the invention 100. The handle 300 may extend perpendicularly from the one or more sides 215 of the housing 200 and may be coupled to the one or more sides 215 of the housing 200. The outer surface of the handle 300 may be contoured or textured to increase friction with a user's hand (not illustrated in the figures). The handle 300 may comprise a cap 350 at the end of the handle 300 that is opposite the housing 200. The cap 350 may be removable and may provide access for replacing one or more batteries 500 located within the handle 300. The mechanical interface between the cap 350 and the handle 300 may be threaded.

The motor 510 may be an electric motor. The motor 510 may be powered by the one or more batteries 500. When energized, the motor 510 may cause rotation of the shaft 515 and the sprocket 230 coupled to the shaft 515. The motor 510 may be energized and de-energized by activating an on/off control 530. The on/off control 530 may take several forms. As a non-limiting example, the on/off control 530 may be contacts at the interface between the cap 350 and the handle 300 which may make and break an electrical connection when the cap 350 is twisted. As an additional non-limiting example, the on/off control 530 may be a push-button switch located in the cap 350 which can be activated by pressing against a flexible end of the cap 350.

The motor 510, the one or more batteries 500, and the on/off control 530 may be interconnected by wiring 520. The cap 350 may include electrical contacts in its interface to the handle 300 to route a connection to one end of the one or more batteries 500 through the cap 350 to the wiring 520 within the handle 300.

In use, the invention 100 is held in the user's hand and the motor 510 is energized using the on/off control 530. Energizing the motor 510 causes the sprocket 230 to turn, which causes the bead loop 400 to move through the housing 200. When the bead loop 400 exits the housing 200 at the first bead aperture 240 it turns and moves towards the handle 300 before re-entering the housing 200 at the second bead aperture 245. The invention 100 may be held above the baked product 900 and the bead loop 400 may be brought into contact with the baked product 900. The bead loop 400 may pull the plurality of beads 410 through the baked product 900 and the plurality of beads 410 may pull the excessive dough 910 out of the baked product 900. The baked product 900 may be turned so that the excessive dough 910 may be removed from multiple locations of the baked product 900. As a non-limiting example, the baked product 900 may be a sliced bagel or roll.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" means to place two or more components into positions and orientations which either arranges the components along a straight line or within the same plane or which will allow the next step of assembly to proceed. As a non-limiting example, the next step of assembly may be to insert one component into another component.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may be construed to mean recharging or replacing individual cells, individual batteries of cells, or a package of multiple battery cells as is appropriate for any given battery technology that may be used. The battery may require electrical contacts, which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used in this disclosure, a "cord" is a flexible piece of string, line, rope, or wire that is at least several times its diameter in length. Cords may be made from threads, yarns, piles, or strands of material that are braided or twisted together, from a monofilament (such as fishing line), or from one or more wires. Cords have tensile strength but are too flexible to provide compressive strength and are not suitable for use in pushing objects. String, line, cable, and rope are synonyms for cord.

As used herein, the words "couple", "couples", "coupled" or "coupling", mean connected, either directly or indirectly and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, an "electric motor" is a device that converts electric energy into rotational mechanical energy.

As used herein, "front" means the side of an object that is closest to a forward direction of travel under normal use of the object or the side or part of an object that normally presents itself to view or that is normally used first. "Rear" or "back" refers to the side that is opposite the front.

As used in this disclosure, when referring to an item or device, "handheld" means that the size and weight of the item or device is appropriate for operation while a person holds the item or device with one or both hands.

As used in this disclosure, a "handle" is an object by which a tool, object, or door is held or manipulated with the hand.

As used in this disclosure, a "housing" is a rigid casing that encloses and protects one or more devices.

As used in this disclosure, the word "interior" is used as a relational term that implies that an object is located or contained within the boundary of a structure or a space.

As used herein, the word "longitudinal" or "longitudinally" refers to a lengthwise or longest direction.

As used in this disclosure, the term "shaft" is used to describe a rigid cylinder that is often used as the handle of a tool or implement. The definition of shaft explicitly includes solid shafts or shafts that comprise a hollow passage through the shaft along the center axis of the shaft cylinder, whether the shaft has one or more sealed ends or not.

As used in this disclosure, a "switch" is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A motorized bread scooper comprising:
a housing, a handle, a motor, and a bead loop;
wherein the motorized bread scooper is a handheld device that removes excessive dough from a baked product by pulling the bead loop through the baked product;
wherein removal of the excessive dough reduces caloric intake resulting from eating the baked product;
wherein the housing comprises a top surface, a bottom surface, and one or more sides;
wherein the housing is an enclosure for the motor, a sprocket, and a bead guide.

2. The motorized bread scooper according to claim 1
wherein the bottom surface of the housing comprises a first bead aperture and a second bead aperture;
wherein the first bead aperture and the second bead aperture is aligned such that a line passing through the center of the first bead aperture and the center of the second bead aperture is parallel to a longitudinal axis of the handle.

3. The motorized bread scooper according to claim 2
wherein the motor is mounted within the housing such that a shaft of the motor is oriented perpendicularly to the longitudinal axis of the handle and parallel to the bottom surface of the housing;
wherein the shaft is positioned between the top surface and the bottom surface, generally at the halfway point between the top surface and the bottom surface.

4. The motorized bread scooper according to claim 3
wherein the sprocket is coupled to the shaft of the motor;
wherein a diameter of the sprocket is less than a height of the motor housing.

5. The motorized bread scooper according to claim 4
wherein the sprocket comprises a plurality of dimples surrounding its circumference;
wherein the spacing of the plurality of dimples match the distance between adjacent beads of the bead loop;
wherein as the sprocket moves, a plurality of beads rest in the plurality of dimples and become trapped between the plurality of dimples and the bead guide;

wherein this trapping of the plurality of beads within the plurality of dimples allows the sprocket to move the bead loop as the sprocket spins.

6. The motorized bread scooper according to claim 5
wherein the bead guide is an arch-shaped, tubular pathway for the bead loop;
wherein the bead guide directs the path of the bead loop as it passes through the housing;
wherein the bead guide is coupled to the interior of the housing.

7. The motorized bread scooper according to claim 6
wherein the bead guide is oriented such that a first end of the bead guide is aligned with the first bead aperture and a second end of the bead guide is aligned with the second bead aperture;
wherein the bead guide is positioned to align with the sprocket such that the bead loop must pass over the sprocket as it moves through the housing.

8. The motorized bread scooper according to claim 7
wherein the bead guide comprises a sprocket extension to enclose the sprocket and to allow the bead loop to pass from the bead guide onto the sprocket and back into the bead guide as the bead loop moves through the housing.

9. The motorized bread scooper according to claim 8
wherein the bead loop comprises the plurality of beads with each of the adjacent beads coupled by a bead-to-bead coupling;
wherein the bead loop forms a continuous loop with no identifiable end;
wherein the length of the continuous loop is at least as long as the distance through the bead guide from the first bead aperture to the second bead aperture plus the distance between the first bead aperture and the second bead aperture along the bottom surface of the housing.

10. The motorized bread scooper according to claim 9
wherein the plurality of beads are spherical plastic beads;
wherein the bead-to-bead coupling is a sinuous material running through the center of the plurality of beads.

11. The motorized bread scooper according to claim 10
wherein as the motor moves the sprocket, the bead loop is routed through the housing in a path where the bead loop moves over the top of the sprocket, away from the handle, into the bead guide and emerges from the housing at the first bead aperture;
wherein as the motor moves the sprocket, the bead loop moves towards the handle and enters the housing again at the second bead aperture;
wherein as the motor moves the sprocket, the bead loop moves through the bead guide away from the handle and towards the sprocket, where the path repeats;
wherein while the bead loop is outside of the housing and moving towards the handle, it pulls the excessive dough from the baked product.

12. The motorized bread scooper according to claim 11
wherein the handle is a cylindrically shaped hand hold for the motorized bread scooper;
wherein the handle extends perpendicularly from the one or more sides of the housing and is coupled to the one or more sides of the housing.

13. The motorized bread scooper according to claim 12
wherein the outer surface of the handle is contoured or textured to increase friction with a user's hand.

14. The motorized bread scooper according to claim 12
wherein the handle comprises a cap at the end of the handle that is opposite the housing;
wherein the cap is removable and provides access for replacing one or more batteries located within the handle;
wherein the mechanical interface between the cap and the handle is threaded.

15. The motorized bread scooper according to claim 14
wherein the motor is an electric motor;
wherein the motor is powered by the one or more batteries;
wherein when energized, the motor causes rotation of the shaft and the sprocket coupled to the shaft;
wherein the motor is energized and de-energized by activating an on/off control.

16. The motorized bread scooper according to claim 15
wherein the on/off control is contacts at the interface between the cap and the handle which makes and break an electrical connection when the cap is twisted.

17. The motorized bread scooper according to claim 15
wherein the on/off control is a push-button switch located in the cap which can be activated by pressing against a flexible end of the cap.

18. The motorized bread scooper according to claim 15
wherein the motor, the one or more batteries, and the on/off control is interconnected by wiring;
wherein the cap includes electrical contacts in its interface to the handle to route a connection to one end of the one or more batteries through the cap to the wiring within the handle.

* * * * *